United States Patent
Day et al.

(10) Patent No.: US 7,725,618 B2
(45) Date of Patent: May 25, 2010

(54) MEMORY BARRIERS PRIMITIVES IN AN ASYMMETRIC HETEROGENEOUS MULTIPROCESSOR ENVIRONMENT

(75) Inventors: Michael Norman Day, Round Rock, TX (US); Charles Ray Johns, Austin, TX (US); Peichun Peter Liu, Austin, TX (US); Thuong Truong, Austin, TX (US); Takeshi Yamazaki, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 10/902,474

(22) Filed: Jul. 29, 2004

(65) Prior Publication Data

US 2006/0026309 A1 Feb. 2, 2006

(51) Int. Cl.
G06F 13/28 (2006.01)
(52) U.S. Cl. .......................... 710/22; 711/152
(58) Field of Classification Search ............ 710/22, 710/107, 312, 5; 709/200–216, 238; 711/133–148, 711/163; 345/503–522
See application file for complete search history.

(56) References Cited

U.S. PATENT DOCUMENTS

| | | | |
|---|---|---|---|
| 5,887,134 A * | 3/1999 | Ebrahim | 709/200 |
| 5,911,051 A * | 6/1999 | Carson et al. | 710/107 |
| 6,205,494 B1 | 3/2001 | Williams | |
| 6,209,073 B1 | 3/2001 | Okpisz et al. | |
| 6,347,349 B1 * | 2/2002 | Neal et al. | 710/62 |
| 6,609,192 B1 | 8/2003 | Guthrie et al. | |
| 6,658,520 B1 * | 12/2003 | Bennett | 710/312 |
| 6,738,836 B1 * | 5/2004 | Kessler et al. | 710/22 |
| 6,947,049 B2 * | 9/2005 | Spitzer et al. | 345/522 |
| 2004/0088499 A1 * | 5/2004 | Woodward | 711/148 |
| 2004/0160446 A1 * | 8/2004 | Gosalia et al. | 345/503 |
| 2005/0154832 A1 * | 7/2005 | Steely et al. | 711/133 |

FOREIGN PATENT DOCUMENTS

WO PCT/IB2005/003974 7/2005

OTHER PUBLICATIONS

Korean Intellectual Property Office, Notice of Preliminary Rejection; Patent Appl'n No. 10-2007-7001629; Mar. 31, 2008.

* cited by examiner

Primary Examiner—Henry W. H. Tsai
Assistant Examiner—Elias Mamo
(74) Attorney, Agent, or Firm—Jill Poimboeuf; Scott Charles Richardson; The Brevetto Law Group

(57) ABSTRACT

The present invention provides a method and apparatus for creating memory barriers in a Direct Memory Access (DMA) device. A memory barrier command is received and a memory command is received. The memory command is executed based on the memory barrier command. A bus operation is initiated based on the memory barrier command. A bus operation acknowledgment is received based on the bus operation. The memory barrier command is executed based on the bus operation acknowledgment. In a particular aspect, memory barrier commands are direct memory access sync (dmasync) and direct memory access enforce in-order execution of input/output (dmaeieio) commands.

20 Claims, 4 Drawing Sheets

MEMORY BARRIERS PRIMITIVES IN AN ASYMMETRIC HETEROGENEOUS MULTIPROCESSOR ENVIRONMENT

CROSS-REFERENCED APPLICATIONS

This application relates to co-pending U.S. patent applications entitled "METHOD FOR ASYNCHRONOUS DMA COMMAND COMPLETION NOTIFICATION" (application Ser. No. 10/448,237), filed on May 29, 2003, and "ESTABLISHING COMMAND ORDER IN AN OUT OF ORDER DMA COMMAND QUEUE", filed concurrently herewith.

TECHNICAL FIELD

The present invention relates generally to Direct Memory Access (DMA) control and, more particularly, to providing memory barrier primitives in an asymmetric heterogeneous multiprocessor environment using a DMA mechanism.

BACKGROUND

In conventional multiprocessor (MP) systems, multiple processors have access to a common shared memory. To improve the performance of these systems, the storage models for ordering of storage accesses is weakly consistent. Weakly consistent means that the order in which accesses are performed by the processor, the ordering in which these accesses are performed on the processor bus, the order in which accesses are performed with respect to another processor or mechanism, and the order in which these accesses are performed in storage may all be different.

The weakly consistent storage model places on a software program the responsibility to ensure the ordering of accesses to storage that is shared among two or more processors and/or mechanisms. In a conventional symmetric multiprocessor (SMP), several means are provided to allow a software program to enforce ordering of storage access to shared memory. For example, on the PowerPC®, a plurality of memory barrier instructions are provided, such as "SYNC" (also sometimes referred to as "heavy-weight SYNC"), "lightweight SYNC," and "EIEIO" (Enforce In-order Execution of I/O). Generally, the SYNC instruction creates a memory barrier. That is, on a given processor, any load or store instructions ahead of the SYNC instruction in the program sequence must complete with respect to all other processors and mechanisms, before any instruction after the SYNC instruction can be executed.

A lightweight SYNC creates a memory barrier that provides the same ordering function as the SYNC instruction, except that a load caused by an instruction following the lightweight SYNC may be performed before a store caused by an instruction that precedes the lightweight SYNC, and the ordering does not apply to accesses to I/O memory (memory-mapped I/O). The EIEIO instruction creates a memory barrier that provides the same ordering function as the SYNC instruction except that ordering applies to accesses to I/O memory. The EIEIO also orders stores.

In a conventional MP system, execution of memory barrier instructions is limited to tightly coupled processors, which places an additional workload on the control processors (i.e., processing units (PUs)) to manage other non-symmetric processors and/or devices within a heterogeneous MP system. In some cases, this limitation can also limit the ability of a non-symmetrical processor to manage system resources since the storage ordering cannot be controlled.

Therefore, there is a need for a method and/or system for providing memory barrier instructions that addresses at least some of the problems and disadvantages associated with conventional systems and methods.

SUMMARY OF THE INVENTION

The present invention provides a method for creating memory barriers in a Direct Memory Access (DMA) device. A memory barrier command is received and a memory command is received. The memory command is executed based on the memory barrier command. A bus operation is initiated based on the memory barrier command. A bus operation acknowledgment is received based on the bus operation. The memory barrier command is executed based on the bus operation acknowledgment.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
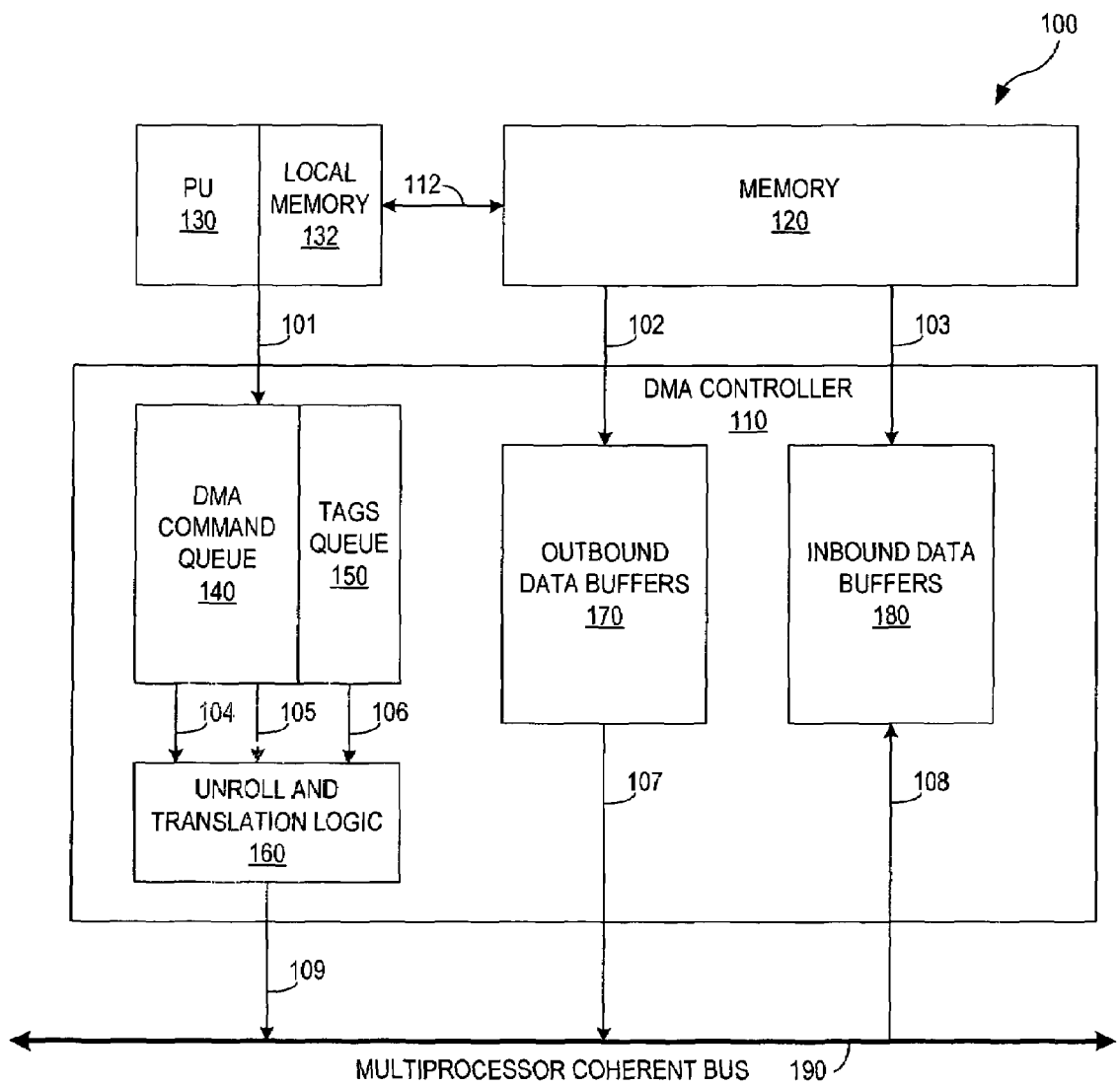
FIG. 1 is a block diagram depicting a system with a DMA controller.

Referring to FIG. 1 of the drawings, the reference numeral 100 generally designates a system with a DMA controller. The system 100 comprises a DMA controller 110, a processing unit (PU) 130, local memory 132, memory 120, and a Multiprocessor (MP) coherent bus 190. The DMA controller 110 further comprises a DMA command queue 140, tags queue 150, unroll and transition logic 160, outbound data buffers 170, and inbound data buffers 180.

In the system 100 with the DMA controller 110, commands are issued and executed. PU 130, with local memory 132, issues commands to the DMA command queue 140. PU 130 is any type of processor, including, for example, a Main PU (MPU), a Synergistic PU (SPU), or any other suitable processor. Local memory 132 can be a variety of memory types including, but not limited to, a cache. Commands sent to DMA command queue 140 are tagged and the tags for the respective commands are tracked in tags queue 150. The tags can be individual to the command or specific to a certain group of commands, thus creating tag groups. From DMA command queue 140, write and read commands are issued to various components (not shown). Data transfer occurs through the outbound data buffers 170 and the inbound data buffers 180. A number of other steps can be incorporated into the execution of a command, such as, for example, decoding.

In conventional systems, the commands in a DMA command queue, such as the DMA command queue 140, are executed in the order of arrival under a strict ordering scheme. DMA controller 110, however, is configured to use a weak ordering (or weakly consistent) scheme to allow the commands in the DMA command queue 140 to execute in a variety of orders. In particular, DMA controller 110 is configured to use a series of embedded flags. The embedded flags act as dependencies for each command and aid in the sequential execution of the commands. Embedded flags are also employed to ensure that high priority commands are executed before low priority commands.

In particular, there are two flags that can be embedded into a command, "barrier" and "fence." Both flags affect only commands in the same tag group. Generally, the embedded fence flag will not allow the command to execute until all commands within the same tag group and issued prior to the command with the embedded fence flag are compete. That is, the fence flag requires that all commands within the same tag group issued prior to the command with the embedded fence be completed prior to the execution of the command with the fence flag. The fence flag does not affect subsequent commands in the queue. Thus, a command issued after a command with an embedded fence flag can execute before the command with the fence.

The barrier flag affects all previous and subsequent commands within the same tag group. Generally, the barrier flag will not allow the command with the barrier flag or any subsequent commands within the same tag group to be executed before the execution of every command in the same tag group issued prior to the command with barrier flag. For example, commands within the same tag group and issued after a command with a barrier flag cannot execute before the command with the barrier flag. Typically, when all commands within the same tag group issued prior to the command with the barrier flag are complete, the command with the barrier flag and subsequent commands within the same tag group can be executed.

PU 130 is also configured to issue a barrier command in lieu of an embedded fence or barrier flag. The barrier command operates on all commands in the queue, regardless of the tag group. The barrier command prevents all subsequent commands from being executed until all previously issued commands are complete. Thus, all commands issued prior to the barrier command are completed prior to the execution of any subsequent command in the queue. Typically, when all commands issued prior to the barrier command are complete, the subsequent commands can be executed.

DMA controller 110 is also configured to receive and execute memory barrier commands. The memory barrier commands provide control in ordering memory transactions on a MP coherent bus, with respect to one or more other processors and/or devices within the system. In the illustrated embodiment, DMA controller 110 is configured to receive direct memory access SYNC (dmasync) and direct memory access EIEIO (dmaeieio) commands. It will be understood to those skilled in the art that DMA controller 110 may be configured to receive other direct memory access memory barrier commands, including, for example, a direct memory access lightweight SYNC (dmalwsync) command.

Generally, dmasync commands provide a mechanism for ensuring that the effects of a preceding DMA command are complete with respect to all processors and/or mechanisms within the system. Generally, dmaeieio commands provide a mechanism for ordering bus operations with respect to all processors and/or mechanisms within the system. Dmasync commands also provide a mechanism for ordering bus operations, but generally do so at a reduced performance rate relative to dmaeieio commands. Typically, dmasync and dmaeieio commands are configured to operate with a command barrier. In the illustrated embodiment, the dmasync and dmaeieio commands include an implied tag-specific barrier. It will be understood to those skilled in the art that DMA controller 110 may be configured to receive other direct memory access memory barrier commands in other forms, including, for example, a dmasync command with an implied fence or a dmaeieio command with an implied fence.

More particularly, the dmasync command provides a mechanism for a software program to guarantee that all previously issued DMA memory writes will be performed with respect to another processor in the system. The dmasync command is employed when strong ordering is required and provides the same ordering for DMA accesses as the well-known PowerPC® SYNC instruction does for processor loads and stores. In particular, accesses created by DMA Get commands are considered loads and accesses created by DMA Put commands are considered stores for ordering. In order to guarantee that all previously issued DMA Put Commands (i.e., memory writes) will be performed, a barrier command precedes the dmasync command. In the illustrated embodiment, the dmasync command is tagged and includes an implied tag-specific barrier. In an alternative embodiment, a barrier command precedes the dmasync command. In another alternative embodiment, a fence command precedes the dmasync command.

The dmaeieio command provides a mechanism for a software program to order DMA memory writes to coherent storage that is not marked as Write-Through Required or Caching Inhibited. The dmaeieio command also provides a mechanism for a software program to order DMA memory reads and writes to storage that is both Caching Inhibited and Guarded, and stores to memory marked as Write Through Required. The dmaeieio command is employed when ordering is required only for the specific types of accesses stated. The dmaeieio command provides the same ordering for DMA accesses as the well-known PowerPC® EIEIO instruction does for processor loads and stores. In particular, accesses created by DMA Get commands are considered loads and accesses created by DMA Put commands are considered stores for ordering. In order to guarantee that all previously issued DMA Commands will be performed, a barrier command precedes the dmaeieio command. In the illustrated embodiment, the dmaeieio command is tagged and includes an implied tag-specific barrier. In an alternative embodiment, a barrier command precedes the dmaeieio command. In another alternative embodiment, a fence command precedes the dmaeieio command. DMA controller 100, through unroll and translation logic 160, unrolls a DMA operation described by a DMA command (and its associated parameters) into one or more smaller bus transactions until the full transfer length is satisfied. Within a weakly consistent memory model, the smaller bus transactions created by unroll and translation logic 160 may be processed out of order by the MP coherent bus 190 as well as any other processors within the system, including the smaller bus transactions from other commands. Moreover, DMA commands can be completed in a different order than that presented to the DMA command queue 140, for improved performance. In all cases, all DMA commands appear to software to start in the same order as presented to the DMA command queue 140.

In order for the DMA system 100 to operate, there are a series of necessary connections. PU 130 is coupled to local memory 132 through a first communication channel (not shown). PU 130 is coupled to the DMA command queue 140 through a second communication channel 101. Local memory 132 is coupled to memory 120 through a third communication channel 112. Memory 120 is coupled to the outbound data buffers 170 through a fourth communication channel 102. Memory 120 is coupled to the inbound data buffers 108 through a fifth communication channel 103. DMA command queue 140 is coupled to the unroll and transition logic 160 through a sixth communication channel 104 and through seventh communication channel 105. Tags queue 150 is coupled to the unroll and transition logic 160 through the eighth communication channel 106. Outbound data buffers 170 are coupled to the MP coherent bus 190 through a ninth communication channel 107. Inbound data buffers 180 are connected to MP coherent bus 190 through a tenth communication channel 108. The unroll and transition logic 160 is coupled to the MP coherent bus 190 through an eleventh communication channel 109.

Figure 2:
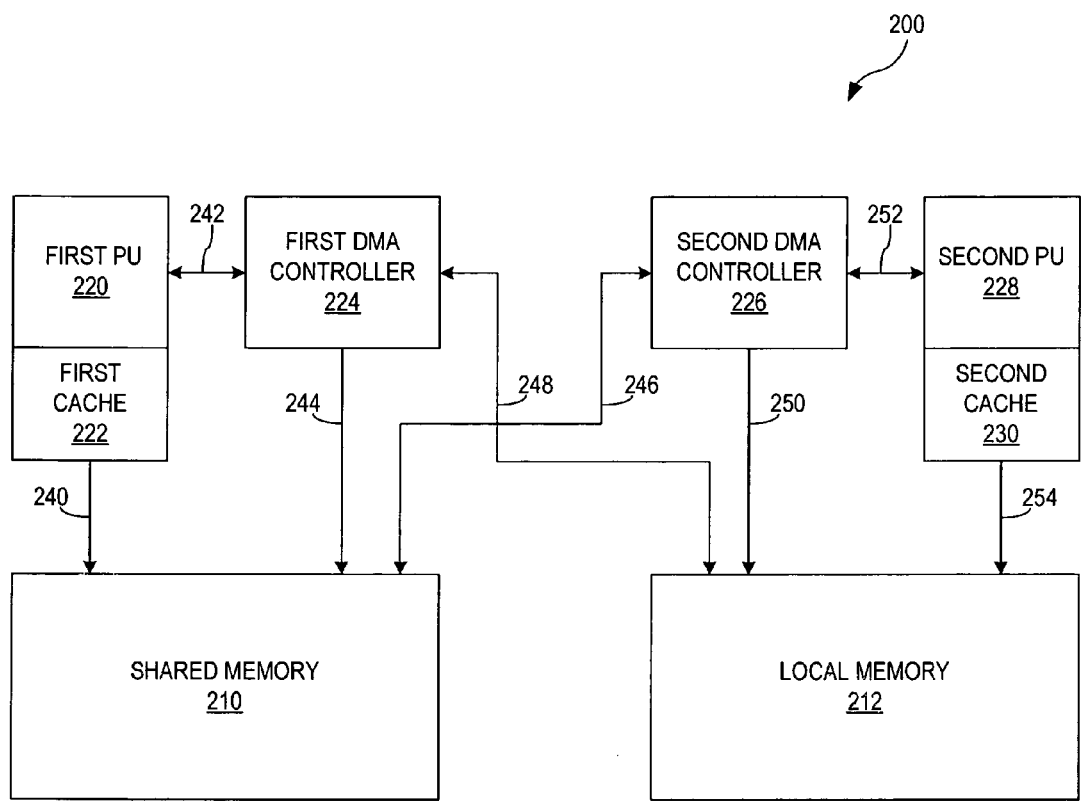
FIG. 2 is a block diagram depicting a Multiprocessor (MP) system.

Referring to FIG. 2 of the drawings, the reference numeral 200 generally designates an MP system. The MP system 200 comprises a shared memory 210, a local memory 212, a first PU 220, a first cache 222, a first DMA controller 224, a second DMA controller 226, a second PU 228, and a second cache 230. In the illustrated embodiment, the first cache 222 and the second cache 230 are system caches, are well-known, and operate as an external memory interface for their respective processors.

The multiple processors of MP system 200 operate independently or in conjunction to read and/or write data from a variety of memory devices. First PU 220 is configured to issue read, write, dmasync, and dmaeieio commands to the first DMA controller 224. Second PU 228 is configured to issue read, write, dmasync, and dmaeieio commands to the second DMA controller 226. First DMA controller 224 and second DMA controller 226 are configured to read and write data from local memory 212 and shared memory 210. In the illustrated embodiment, there is a single PU for each DMA controller.

In operation, first DMA controller 224 receives commands from first PU 220 to move data between shared memory 210 and local memory 212. Similarly, second DMA controller 226 receives commands from second PU 228 to move data between shared memory 210 and local memory 212. Because the data transfer direction for DMA commands is always referenced from the perspective of a PU, commands that transfer data from shared memory 210 into local memory 212 are considered as GET commands, while commands that transfer data from local memory 212 into shared memory 210 are considered as PUT commands. Parameters supplied with the DMA commands provide additional information regarding the data transfer, such as, for example, the data transfer size, the tag, and addressing information.

When first DMA controller 224 encounters a dmasync command, first DMA controller 224 completes all commands with the same tag as the dmasync command and presented to the DMA command queue preceding the dmasync command. Specifically, Write Data for all PUT commands with the same tag as the dmasync command must be transferred to the multiprocessor coherent bus and past any point in the protocol that can cause a retry event. Read Data for all GET commands with the same tag as the dmasync command must be visible in local memory 212.

Once all preceding commands with the same tag as the dmasync are complete, DMA controller 224 initiates a sync bus transaction. The sync bus transaction serves as a barrier point for other processors and/or mechanisms within the system. The other processors and/or mechanisms must complete all operations performed by the processor issuing the dmasync before acknowledging the sync bus transaction. DMA controller 224 can only complete the dmasync command after all processors and/or mechanisms within the system have acknowledged the sync bus transaction. Thus, the dmasync command ensures that the results of all DMA commands with the same tag as the dmasync are complete and visible with respect to all of the processors and/or mechanisms with the system. Second DMA controller 226 processes dmasync commands in the same manner as first DMA controller 224.

When first DMA controller 224 encounters a dmaeieio command, first DMA controller 224 completes all commands with the same tag as the dmaeieio command and presented to the DMA command queue preceding the dmaeieio command. Specifically, Write Data for all PUT commands with the same tag as the dmaeieio command must be transferred to the multiprocessor coherent bus and past any point in the protocol that can cause a retry event. Read Data for all GET commands with the same tag as the dmaeieio command must be visible in local memory 212.

Once all preceding commands with the same tag as the dmaeieio are complete, DMA controller 224 initiates a eieio bus transaction. The eieio bus transaction serves as a barrier point for other processors and/or mechanisms within the system to order specific types of accesses, i.e., DMA memory writes to coherent storage that is not marked as Write-Through Required or Caching Inhibited, and DMA memory reads and writes to storage that is both Caching Inhibited and Guarded. The other processors and/or mechanisms wait to acknowledge the eieio bus transaction in order to ensure the ordering of all previous bus transactions. DMA controller 224 can only complete the dmaeieio command after all processors and/or mechanisms within the system have acknowledged the eieio bus transaction. Thus, the dmaeieio command allows for enhanced system performance by enforcing ordering, instead of the visibility of a DMA operation. Second DMA controller 226 processes dmaeieio commands in the same manner as first DMA controller 224.

The dmasync and dmaeieio commands allow an asymmetrical processor and/or device to participate in the weakly consistent storage model of a conventional MP system, thereby improving their performance. Moreover, the dmasync and dmaeieio commands allow a PU to assume responsibility for ensuring the ordering of accesses to storage, thereby removing the responsibility from the control processors, and allowing the PU to control any resource in a manner similar to the control processors, with little or no support from the control processors. Additionally, relieving the control processors of the responsibility to ensure the ordering of accesses to storage significantly improves the utilization and performance of the control processors and DMA Controller, and helps to prevent the control processors from becoming overburdened by the multiple asymmetrical units.

Therefore, the dmasync and dmaeieio commands extend the weakly ordered storage model concepts of conventional MP systems to an asymmetric heterogeneous multiprocessor environment utilizing processors and/or devices accessing shared storage using a DMA mechanism. Moreover, the dmasync and dmaeieio commands may be employed in other asymmetric devices and in a conventional symmetric MP system with local or private memory. The dmasync and dmaeieio commands may also be employed in a DMA controller that moves data from one location in system memory to another location in system memory.

In order for MP system 200 to operate, there are a series of necessary connections. PU 220 is coupled to the first cache 222 through a twelfth communication channel (not shown). PU 220 is coupled to the first DMA Controller 224 through a thirteenth communication channel 242. First cache 222 is coupled to shared memory 210 through a fourteenth communication channel 240. First DMA controller 224 is coupled to shared memory 210 through a fifteenth communication channel 244. First DMA controller 224 is also coupled to local memory through a sixteenth communication channel 248. Second PU 228 is coupled to second cache 230 through a seventeenth communication channel (not shown). Second cache 230 is coupled to local memory 212 through an eighteenth communication channel 254. Second PU 228 is also coupled to second DMA controller 226 through a nineteenth communication channel 252. Second DMA controller 226 is coupled to local memory 212 through a twentieth communication channel 250. Second DMA controller 226 is also coupled to shared memory 210 through a twenty-first communication channel 246.

Figure 3:
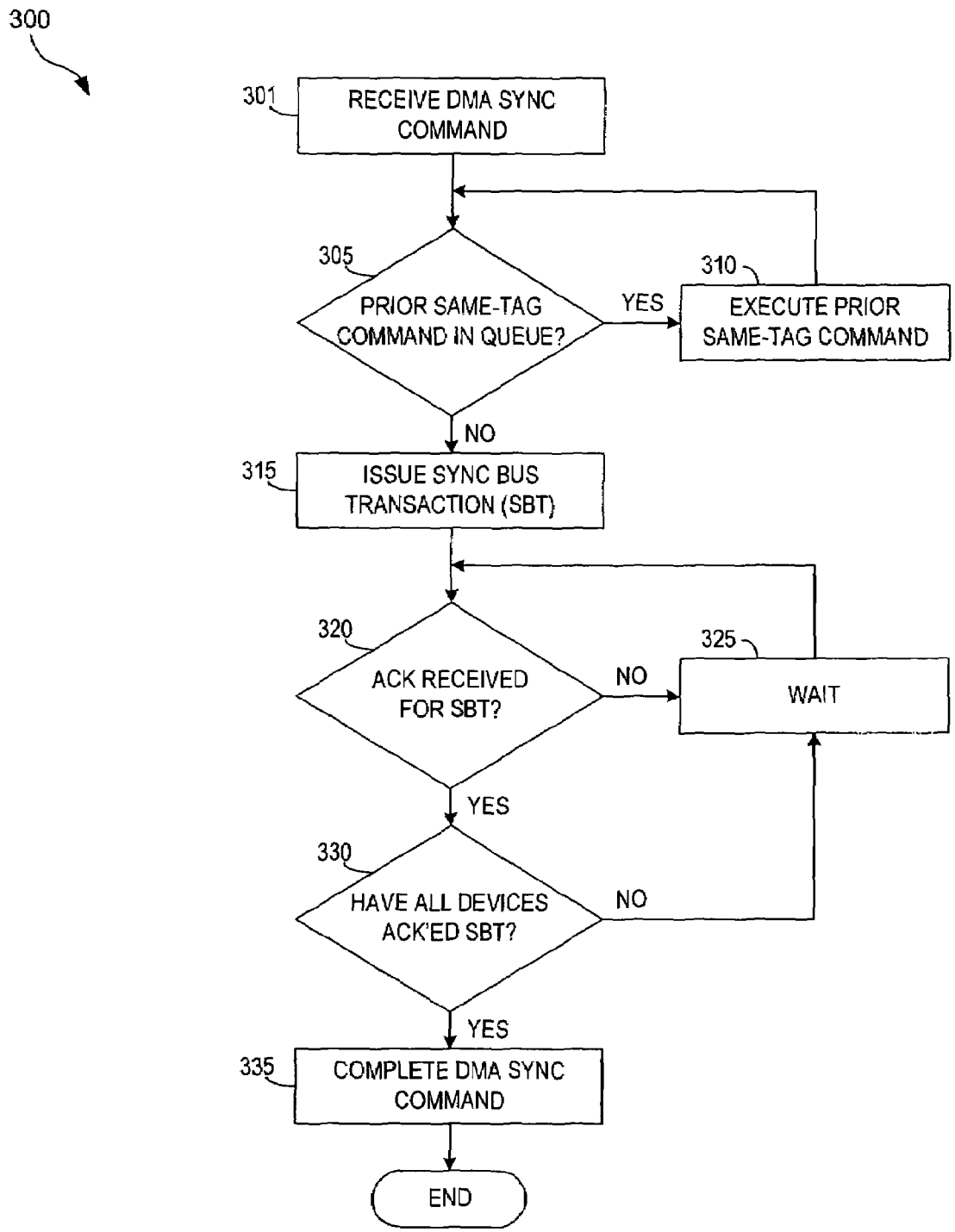
FIG. 3 is a flow diagram illustrating the operation of a direct memory access sync (dmasync) command.

Referring to FIG. 3 of the drawings, the reference numeral 300 generally designates a flow chart depicting the operation of the dmasync command. The process begins at step 301, wherein a DMA controller receives a tagged dmasync command. For example, step 301 is performed by DMA controller 110 of FIG. 1 receiving a tagged dmasync command from PU 130 of FIG. 1. For illustrative purposes, all of the steps performed in FIG. 3 are performed by DMA controller 110 of FIG. 1. It will be understood that the steps performed in FIG. 3 may also be performed by First DMA controller 224 and/or second DMA controller 226 of FIG. 2.

Next, at decisional step 305, the DMA controller searches the DMA command queue for DMA commands with the same tag as, and received prior to, the tagged dmasync command received in step 301. If there is a preceding same-tag DMA command, the process continues along the YES branch to step 310. At step 310, the DMA controller executes the preceding same-tag DMA command and the process returns to step 305. If there is no preceding same-tag DMA command, the process continues along the NO branch to step 315.

At step 315, the DMA controller issues a sync bus transaction. Next, at decisional step 320, the DMA controller determines whether the sync bus transaction has been acknowledged by any processor or device within the system. If no sync bus transaction acknowledgment has been received, the process continues along the NO branch to step 325. At step 325, the DMA controller waits. In one embodiment, the DMA controller waits by pausing operations for a predetermined period of time, such as, for example, 0.5 microseconds. In another embodiment, the DMA controller waits by executing DMA commands that do not include the same tag as the tagged dmasync command. The process then returns to decisional step 320.

If at decisional step 320 a sync bus transaction acknowledgment has been received, the process continues along the YES branch to decisional step 330. At decisional step 330, the DMA controller determines whether the sync bus transaction has been acknowledged by all processors and/or devices within the system. If the sync bus transaction has not been acknowledged by all processors and/or devices within the system, the process continues along the NO branch to step 325.

If at decisional step 325 the sync bus transaction has been acknowledged by all processors and/or devices within the system, the process continues along the YES branch to step 335. At step 335, the DMA controller completes the dmasync command and the process ends. Commands subsequent to the dmasync can now be executed.

Figure 4:
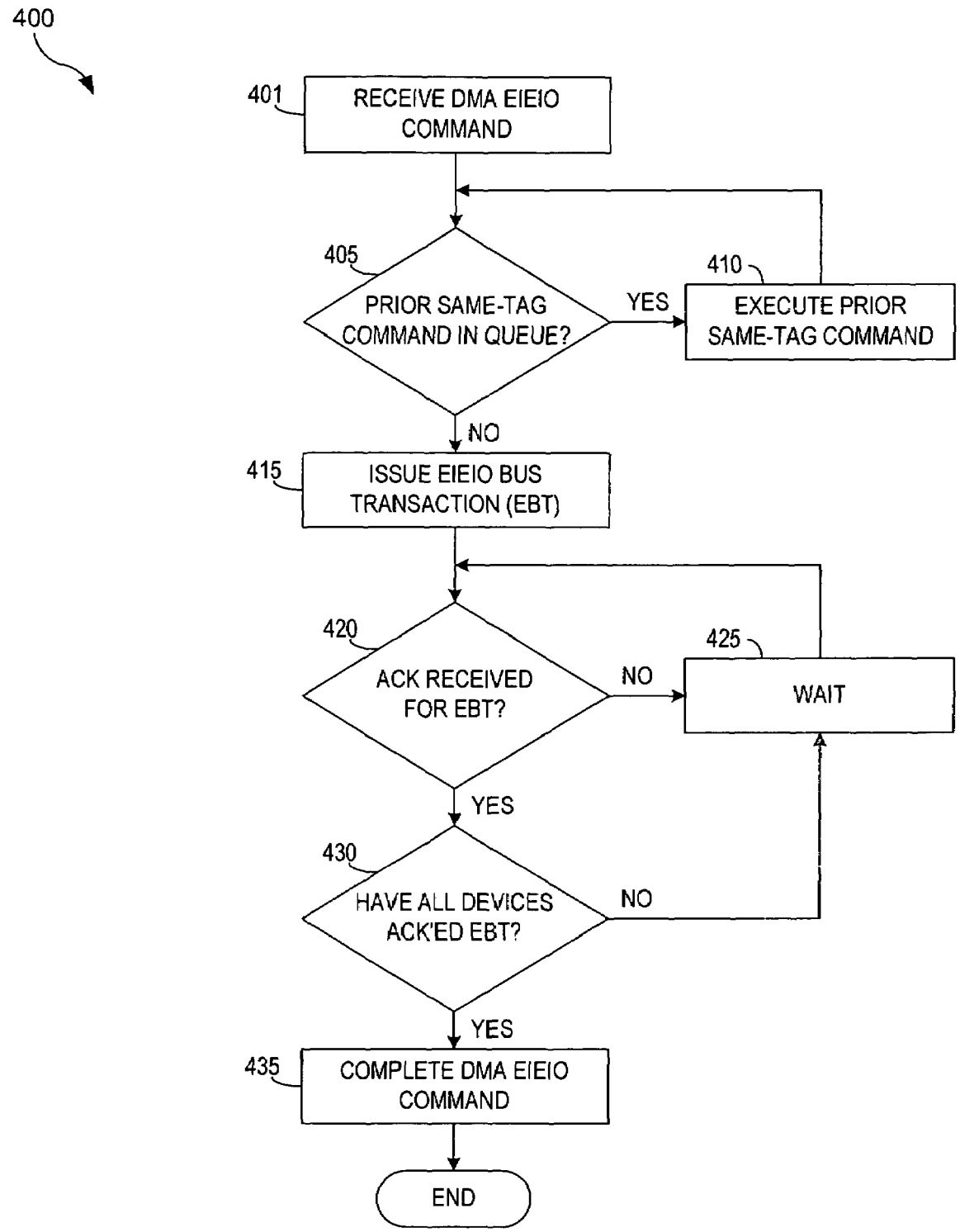
FIG. 4 is a flow diagram illustrating the operation of a direct memory access enforce in-order execution of input/output (dmaeieio) command.

Referring to FIG. 4 of the drawings, the reference numeral 400 generally designates a flow chart depicting the operation of the dmaeieio command. The process begins at step 401, wherein a DMA controller receives a tagged dmaeieio command. For example, step 401 is performed by DMA controller 110 of FIG. 1 receiving a tagged dmaeieio command from PU 130 of FIG. 1. For illustrative purposes, all of the steps performed in FIG. 4 are performed by DMA controller 110 of FIG. 11. It will be understood that the steps performed in FIG. 4 may also be performed by First DMA controller 224 and/or second DMA controller 226 of FIG. 2.

Next, at decisional step 405, the DMA controller searches the DMA command queue for DMA commands with the same tag as, and received prior to, the tagged dmaeieio command received in step 401. If there is a preceding same-tag DMA command, the process continues along the YES branch to step 410. At step 410, the DMA controller executes the preceding same-tag DMA command and the process returns to step 405. If there is no preceding same-tag DMA command, the process continues along the NO branch to step 415.

At step 415, the DMA controller issues an eieio bus transaction. Next, at decisional step 420, the DMA controller determines whether the eieio bus transaction has been acknowledged by any processor or device within the system. If no eieio bus transaction acknowledgment has been received, the process continues along the NO branch to step 425. At step 425, the DMA controller waits. In one embodiment, the DMA controller waits by pausing operations for a predetermined period of time, such as, for example, 0.5 microseconds. In another embodiment, the DMA controller waits by executing DMA commands that do not include the same tag as the tagged dmaeieio command. The process then returns to decisional step 420.

If at decisional step 420 an eieio bus transaction acknowledgment has been received, the process continues along the YES branch to decisional step 430. At decisional step 430, the DMA controller determines whether the eieio bus transaction has been acknowledged by all processors and/or devices within the system. If the eieio bus transaction has not been acknowledged by all processors and/or devices: within the system, the process continues along the NO branch to step 425.

If at decisional step 425 the eieio bus transaction has been acknowledged by all processors and/or devices within the system, the process continues along the YES branch to step 435. At step 435, the DMA controller completes the dmaeieio command and the process ends.

While only two specific memory barrier commands are described herein (dmasync and dmaeieio), it will be understood to one skilled in the art that other memory barrier commands or different memory barrier command forms may also be defined. For example, the DMA controller may be configured to receive direct memory access lightweight SYNC (dmalwsync) commands, or a dmaeieio command with an implied fence.

Moreover, while the specific memory barrier commands herein are described with reference to PowerPC® architecture, it will be understood to one skilled in the art that other memory barrier commands may be described with reference to other architectures. Accordingly, the DMA controller may be configured to receive memory barrier commands that provide the same DMA accesses for ordering as memory barrier instructions in other architectures.

Furthermore, while the specific memory barrier commands herein are described in operation in a weakly ordered memory model in an asymmetric heterogeneous MP environment, it will be understood to one skilled in the art that the memory barrier commands may also be employed in other types of memory models and in a symmetric MP environment.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A method for creating memory barriers in multiprocessor system including a Direct Memory Access (DMA) device, comprising:
    receiving a memory barrier command configured to control the multiprocessor system and the DMA device;
    wherein the memory barrier command comprises one of a direct memory access synchronization (dmasync) command or a direct memory access enforce in-order execution of input/output (dmaeieio) command;
    receiving a memory command;
    executing the memory command based on the memory barrier command;
    initiating a bus operation for the DMA device based on the memory barrier command;
    receiving a bus operation acknowledgment based on the bus operation; and
    executing the memory barrier command based on the bus operation acknowledgment.

2. The method as recited in claim 1, wherein the memory command is executed before the memory barrier command.

3. The method as recited in claim 1, wherein the memory command is executed after the memory barrier command.

4. The method as recited in claim 1, wherein the bus operation is a synchronize bus transaction.

5. The method as recited in claim 1, wherein the bus operation is an enforce in-order execution of input/output (eieio) bus transaction.

6. The method as recited in claim 1, wherein the memory barrier command comprises at least a memory command barrier tag and the memory command comprises at least a memory command tag.

7. The method as recited in claim 6, wherein the memory command is executed based on the memory command barrier tag and the memory command tag.

8. An apparatus for creating memory barriers in a multiprocessor system including a Direct Memory Access (DMA) device, comprising:
    a first communication channel configured to receive memory commands and memory barrier commands configured to control the multiprocessor system and the DMA device;
    wherein the memory barrier commands comprise one of a direct memory access synchronization (dmasync) command or a direct memory access enforce in-order execution of input/output (dmaeieio) command;
    unroll logic coupled to the first communication channel and configured to initiate a bus operation for the DMA device based on a memory barrier command;
    a second communication channel coupled to the unroll logic and configured to transmit the bus operation and to receive a bus operation acknowledgment; and
    a direct memory access (DMA) controller coupled to the first communication channel, the second communication channel, and the unroll logic and configured to:
        execute memory commands; and
        execute memory barrier commands based on the bus operation acknowledgment.

9. The apparatus as recited in claim 8, wherein the bus operation is a synchronize bus transaction.

10. The apparatus as recited in claim 8, wherein the bus operation is an enforce in-order execution of input/output (eieio) bus transaction.

11. The apparatus as recited in claim 8, wherein the memory commands comprise at least an associated memory command tag and the memory barrier commands comprise at least an associated memory barrier command tag.

12. The apparatus as recited in claim 11, wherein the DMA controller is further configured to execute memory commands based on an associated memory command tag and an associated memory barrier command tag.

13. The apparatus as recited in claim 8, further comprising a direct memory access (DMA) command queue coupled to the first communication channel and the unroll logic, the DMA command queue configured to store memory commands and memory barrier commands in an order.

14. The apparatus as recited in claim 8, further comprising a plurality of data buffers, wherein the plurality of data buffers are at least configured to be coupled to at least a memory.

15. The apparatus as recited in claim 14, wherein the plurality of data buffers are at least configured to be coupled to the second communication channel.

16. A computer program product for creating memory barriers in a multiprocessor system including a Direct Memory Access (DMA) device, the computer program product having a medium with a computer program embodied thereon, the computer program comprising:
    computer program code for receiving a memory barrier command configured to control the multiprocessor system and the DMA device;
    wherein the memory barrier command comprises one of a direct memory access synchronization (dmasync) command or a direct memory access enforce in-order execution of input/output (dmaeieio) command;
    computer program code for receiving a memory command;
    computer program code for executing the memory command based on the memory barrier command;
    computer program code for initiating a bus for the DMA device operation based on the memory barrier command;
    computer program code for receiving a bus operation acknowledgment based on the bus operation; and
    computer program code for executing the memory barrier command based on the bus operation acknowledgment.

17. The computer program product as recited in claim 16, wherein the bus operation is a synchronize bus transaction.

18. The computer program product as recited in claim 16, wherein the bus operation is an enforce in-order execution of input/output (eieio) bus transaction.

19. The computer program product as recited in claim 16, wherein the memory barrier command comprises at least one memory barrier tag, and the memory command comprises at least one memory command tag.

20. The computer program product as recited in claim 19, further comprising computer program code for executing the memory command based on the memory barrier tag and the memory command tag.

* * * * *